(12) United States Patent
Scharger

(10) Patent No.: US 7,438,507 B2
(45) Date of Patent: Oct. 21, 2008

(54) METHOD AND DEVICE FOR THE TRANSPORTATION OF PULVERULENT FILLING MATERIAL THROUGH A LINE

(75) Inventor: Rolf Scharger, Winterbach (DE)

(73) Assignee: Harro Höfliger Verpackungsmaschinen GmbH, Allmersbach im Tal (DE)

( * ) Notice: Subject to any disclaimer, the term of this patent is extended or adjusted under 35 U.S.C. 154(b) by 128 days.

(21) Appl. No.: 11/350,037

(22) Filed: Feb. 9, 2006

(65) Prior Publication Data

US 2006/0182503 A1 Aug. 17, 2006

(30) Foreign Application Priority Data

Feb. 11, 2005 (DE) .................. 10 2005 006 601

(51) Int. Cl.
*B65G 53/46* (2006.01)
(52) U.S. Cl. .................. 406/128; 406/135; 406/144; 366/10
(58) Field of Classification Search ............ 366/10, 366/11; 406/52, 128, 129, 135, 144
See application file for complete search history.

(56) References Cited

U.S. PATENT DOCUMENTS

| | | | | |
|---|---|---|---|---|
| 2,285,216 A | * | 6/1942 | Lundgren | ............ 406/67 |
| 2,942,860 A | * | 6/1960 | Ridley et al. | ............ 366/11 |
| 4,073,244 A | | 2/1978 | Snowdon | |
| 4,407,436 A | * | 10/1983 | Broadfoot et al. | ............ 222/636 |
| 4,440,499 A | * | 4/1984 | Tomikawa et al. | ............ 366/3 |
| 4,618,294 A | * | 10/1986 | Brown | ............ 406/113 |
| 4,630,929 A | * | 12/1986 | Medlin | ............ 366/10 |
| 4,808,042 A | * | 2/1989 | Muehlberger et al. | ............ 406/66 |
| 4,815,860 A | * | 3/1989 | Deuse | ............ 366/3 |
| 5,184,892 A | * | 2/1993 | Hafner | ............ 366/10 |
| 5,213,450 A | * | 5/1993 | Bercx | ............ 406/128 |
| 5,433,519 A | * | 7/1995 | Irsch | ............ 366/3 |
| 5,645,379 A | * | 7/1997 | Stoner et al. | ............ 406/67 |
| 5,733,039 A | * | 3/1998 | Egli | ............ 366/10 |
| 6,334,653 B1 | | 1/2002 | Puntke | |

FOREIGN PATENT DOCUMENTS

| | | |
|---|---|---|
| DE | 202 09 156 U1 | 11/2002 |
| DE | 102 26 989 A1 | 1/2004 |
| DE | 102 47 829 A1 | 4/2004 |
| EP | 0 412 330 | 2/1991 |
| FR | 2 573 882 | 5/1986 |

\* cited by examiner

*Primary Examiner*—Joe Dillon, Jr.
(74) *Attorney, Agent, or Firm*—Venable LLP; Robert Kinberg; Steven J. Schwarz

(57) ABSTRACT

A method of transporting pulverulent filling material through at least one line. The method comprises opening a chamber-like line region located in the at least one line, introducing the pulverulent filling material into the chamber-like line region, closing the chamber-like line region, and pressing the pulverulent filling material out of the chamber-like line region and at least partially into the at least one line using at least one compressed air pulse.

6 Claims, 4 Drawing Sheets

DEVICE FOR VARYING PULSE LENGTH AND/OR PRESSURE INTENSITY OF COMPRESSED AIR — 41

METHOD AND DEVICE FOR THE TRANSPORTATION OF PULVERULENT FILLING MATERIAL THROUGH A LINE

CROSS-REFERENCE TO RELATED APPLICATIONS

This application claims the priority of German Patent Application No. 10 2005 006 601.1, filed Feb. 11, 2005, the entire content of which is incorporated herein by reference. The disclosures of all U.S. and foreign patents and patent applications mentioned below are also incorporated herein by reference.

BACKGROUND OF THE INVENTION

The present invention relates to a method for transportation of pulverulent filling material through a line, and in particular, micronized filling material. The invention also relates to a device for carrying out the method.

Pulverulent filling materials may be foodstuffs and luxury items, such as, for example, coffee powder, cocoa powder, and the like. Alternatively, the filling material may be a pharmaceutical, in which case the filling material may contain very small nonflowable pulverized particles, or consist solely of such. In particular, powders used as pharmaceuticals are commonly taken by the patient in the form of what is known as "micronized powder" in very small quantities of 2 to 20 mg (milligrams). Such micronized powders commonly have a particle size of between 0.5 micrometers and 5.0 micrometers and below. Such powders can agglomerate to a very great extent, so that, in technical terms, they cannot be transported and introduced into containers in a simple manner.

German patent document DE 102 47 829 A1 discloses a method and device for the pneumatic conveyance of pulverulent material through a line. The pulverulent material is acted upon alternately by underpressure and overpressure, and is thus alternately sucked into and pressed out of a line section. Action by gas underpressure and gas overpressure requires a filter element. The finer the pulverulent material is, the more quickly such filter elements clog up. In order to maintain the performance and continuity of the powder transport through the line, the overpressure has to be increased continuously in response to the clogging of the filter element. An attempt is made to reduce the degree of contamination of the filter element (and thereby lengthen its useful life) by designing the filter element in such a way that it surrounds, as a hollow cylinder, the section of the line acted upon by the underpressure and overpressure.

Filling devices, such as the types known from German patent documents DE 202 09 156 U1 and DE 102 26 989 A1, are commonly supplied with such pulverulent filling material through lines of this type. Pulverulent filling material is introduced from the filling devices into individual containers in predetermined metered quantities. An interruption in the operation of such filling devices, such as may occur, for example, during cleaning work on the above-mentioned filter element which is no longer sufficiently gas-permeable, is highly undesirable.

SUMMARY OF THE INVENTION

It is an object of the invention to provide a method of supplying pulverulent filling material to filling devices of the above-mentioned type that is as reliable as possible, and at the same time, is as economical as possible.

According to one exemplary embodiment of the present invention, a method of transporting pulverulent filling material through at least one line comprises: opening a chamber-like line region located in the at least one line; introducing the pulverulent filling material into the chamber-like line region; closing the chamber-like line region; and pressing the pulverulent filling material out of the chamber-like line region and at least partially into the at least one line using at least one compressed air pulse.

Another exemplary embodiment of the present invention relates to an apparatus for transporting pulverulent filling material. The apparatus comprises: a storage vessel including at least one exit; a chamber-like line region constituting a powder chamber located at the at least one exit of the storage vessel; a line connected to the chamber-like line region, through which a portion of the pulverulent filling material present in the chamber-like line region is transported out of the chamber-like line region; a compressed air duct that issues into the chamber-like line region; and a closing device for the chamber-like line region, the closing device adapted to close the chamber-like line region powder tight with respect to the storage vessel.

One advantage of the present invention is that no gas-permeable filter elements are required in order to transport the pulverulent filling material. More specifically, the transport of the pulverulent filling material through a line can be implemented solely by gas pressure pulses, such as, for example, air pressure pulses. According to an exemplary embodiment, a chamber-like line region is formed in the line through which pulverulent filling material is to be transported. The chamber-like line region can be opened and pulverulent filling material can be introduced into the chamber-like line region. Subsequently, the chamber-like line region can be closed, and then the introduced filling material can be pressed out of the chamber-like line region and at least a little way into the line by means of at least one compressed air pulse. Additional filling material can then be introduced into the then completely or partially emptied chamber-like line region, and pressed out of the chamber-like line region and a little way into the line in a similar manner. This operation can be repeated intermittently, with the result that filling material portions lying at a greater or lesser distance one behind the other in the line are pressed through the line. At the region of issue of the line, the pulverulent filling material falls, for example, into the storage container of the respective metering device present near the filling device.

The filling of the chamber-like line region may take place from a powder storage vessel. The powder storage vessel may be positioned, for example, with its outlet present in the bottom region in relation to the chamber-like line region in such a way that powder can flow out of the storage vessel and into the chamber-like line region. Subsequently, the chamber-like line region can be closed, and the pulverulent filling material can be pressed out of the line region and into the line by means of one or more compressed air pulses, as described above.

The filling material present in the storage vessel may be loosened continuously or intermittently, in order to avoid the formation of material bridges within the storage vessel.

It has proved advantageous to arrange in the storage vessel a scraping element, by means of which pulverulent filling material can be scraped, that is to say pushed, into the chamber-like line region. The scraping element may at the same time be used in order to close the chamber-like line region. Insofar as the continuously or intermittently driven scraper is located in the region of the orifice of the chamber-like Line region, it may serve as a closure for this line region. During the further movement of the scraper, the latter then releases the orifice, so that a following or the same scraper can again push pulverulent filling material into the line region.

Details relating to the design of the apparatus according to the invention, by means of which the above-described method according to the invention can be carried out, are illustrated in the drawings. It may be advantageous for a plurality of the lines through which pulverulent filling material is transported to end in a single storage vessel. Pulverulent filling material can thereby be transported out of a single storage vessel through a plurality of lines to a plurality of filling devices. The plurality of outlets of the storage vessel may be arranged in the bottom region of the latter and preferably such that the individual orifices of the various lines can be opened and closed successively, or even simultaneously, by means of one scraper moving, for example, rotating, back and forth. The scraper may correspondingly possess a plurality of scraping arms which, on the one hand, push filling material into the individual chamber-like line regions and, on the other hand, close the respective line regions once these have been filled with filling material. As illustrated by way of example in the drawings, this may effectively be made possible in a simple way in technical terms by means of a rotating scraper having a corresponding number of scraping arms.

An agitating device may be provided in the storage vessel in order to avoid bridge formation by the filling material in the storage vessel. This agitator device may be fixedly connected to the scraper in structural terms, so that, during, for example, a rotating movement of the agitator, the scraper also rotates.

The gas, such as, for example, the air pressure pulse required for transporting the individual filling material quantities may be set, as desired, in its pulse length and, independently of this, also in its pressure intensity. In the case of the filter element known in the prior art, which is acted upon alternately by underpressure and by overpressure, and in which the pressure pulse is also utilized for cleaning off the filter element, a specific pressure intensity cannot be undershot. In the present case, this restriction is absent because there is no filter element.

Further refinements and advantages of the invention may be gathered from the features also listed in the claims and from the exemplary embodiment illustrated in the drawings.

BRIEF DESCRIPTION OF THE DRAWINGS

The invention is described and explained in more detail below with reference to the exemplary embodiments illustrated in the drawings, in which.

DETAILED DESCRIPTION OF THE INVENTION

Figure 1:
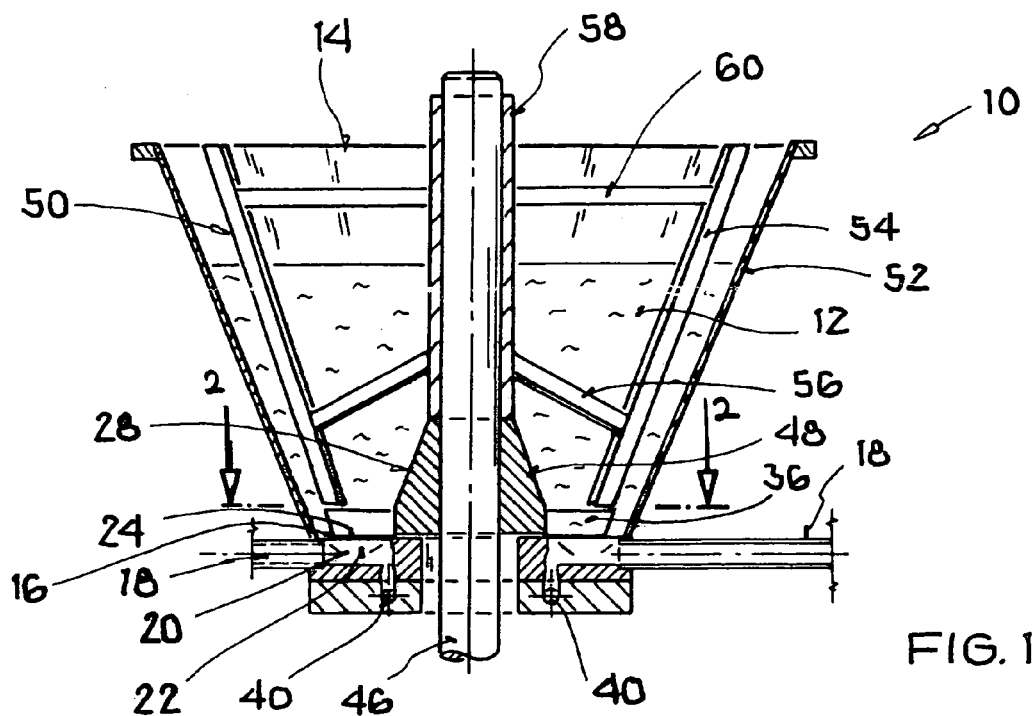
FIG. 1 is a cross-sectional view through a storage vessel according to the invention with open bottom outlets, taken along line 1-1 of FIG. 2.

Referring to FIG. 1, pulverulent filling material 12 is present in a storage vessel 10. The storage vessel 10 can narrow conically downward. In the exemplary embodiment shown, the storage vessel 10 can be closed by means of a cover 14 when it is oriented as shown in FIG. 1. Alternatively, the cover 14 can be omitted.

Six lines 18 can be distributed around the circumference of the bottom 16 of the storage vessel 10. In the exemplary embodiment shown, the lines 18 are arranged in a star-shaped manner. According to an alternative embodiment, more or less than six lines 18 can be arranged on the storage vessel 10.

Each of the lines 18 can end in a chamber-like line region 20 below the bottom 16. This chamber-like line region 20 can include an orifice 22 directed upward toward the storage vessel 10. The orifice 22 can communicate with an orifice 24 of approximately the same size in the bottom 16. The pulverulent filling material 12 present in the storage vessel 10 can fall through the orifice 24 of the bottom 16 and through the orifice 22 in the line 18 into the chamber-like line region 20 of the line 18 from the top downward. This applies to each of the lines 18.

Figure 2:
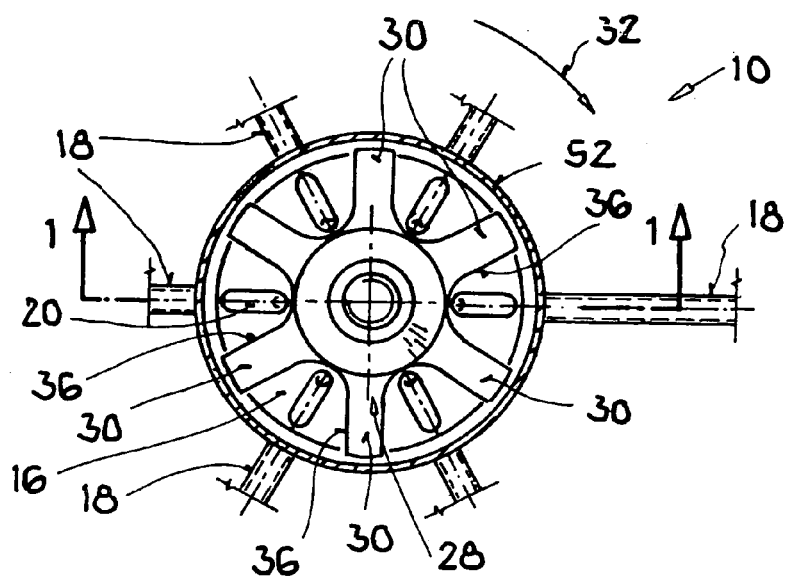
FIG. 2 is a cross-sectional view through the bottom region of the storage vessel of FIG. 1, taken along line 2-2 of FIG. 1.

The chamber-like line region 20 can constitute an upwardly open powder chamber. The filling of the chamber-like line region 20 can take place by means of a scraper 28. The scraper 28, in the exemplary embodiment shown, includes a plurality of scraping arms 30 (see FIG. 2) which rotate over the bottom 16 in a plane parallel to the bottom 16 and at a very short distance from the bottom 16. The scraping arms 30 can push pulverulent filling materials 12 in the direction of rotation 32 (see FIG. 2) into the corresponding line region 20, by means of their longitudinal sides 36. During the further rotation of the respective scraper 28 in the direction of rotation 32, the respective scraping arm 30 can close an orifice 24 in the bottom 16. The orifice 22 in the chamber-like line region 20 is thereby also closed. The scraper 28 can alternatively include only one scraping arm.

Compressed air can be pressed into the line region 20 from outside through a compressed air duct 40 issuing into the rear bottom region of the chamber-like line region 20. The filling material 12 present in the line region 20 can thus be pressed out of the chamber-like line region 20 and at least partially into the line 18. A compressed air pulse is delivered through the compressed air duct 40 only when the scraping arm 30 closes the orifice 24, that is to say, when the chamber-like line region 20 is closed in the direction toward the supply vessel 10. The chamber-like line region 20 can comprise a bag-like end of the respective line 18.

A shaft 46 can pass through the storage vessel 10 substantially centrally and substantially vertically (when viewed in the orientation shown in FIG. 1). The shaft 46 can be driven in the direction of rotation 32 via a motor drive, not illustrated. The shaft 46 can have a hub 48 fixed to it in terms of rotation. As shown in FIG. 1, the hub 48 can be located in the bottom region of the storage vessel 10. In the exemplary embodiment shown in FIG. 2, the six scraping arms 30 project radially from the hub 48. An agitator 50 can adjoin the top of the hub 48. The agitator 50 can be fixed to the shaft 46 in terms of rotation. The agitator 50 can include longitudinal bars 54, which are arranged parallel to the outer wall 52 of the storage vessel 10. The longitudinal bars 54 can be arranged at a distance from one another. Transverse bars 56 can connect the longitudinal bars 54 to a sleeve-shaped carrying member 58 which can be fixed in terms of rotation to the hub 48. Diagonal holding bars 60 can also be provided in the upper region. Consequently, the agitator 50 can have a basket-like configuration.

During rotation of the shaft 46, the agitator 50, together with longitudinal bars 54, transverse bars 56, and upper holding bars 60, can move in the direction of rotation 32, and thereby loosen the pulverulent filling material 12 present inside the storage vessel 10. At the same time, during this rotational movement of the agitator 50, the scraping arms 30 can also move jointly in the direction of rotation 32, causing powder to move into the region of the bottom orifices 24. To the extent the chamber-like line region 20 present under the respective bottom orifice 24 is empty, this line region 20 is thus re-filled with powder. To the extent that powder is still present in the chamber-like line region (e.g., because the powder has not been emptied out of the line region 20 by means of one more compressed air pulses), the scraping arm 30 sweeps over the orifice 24 without powder being introduced into the line region 20.

Figure 3:
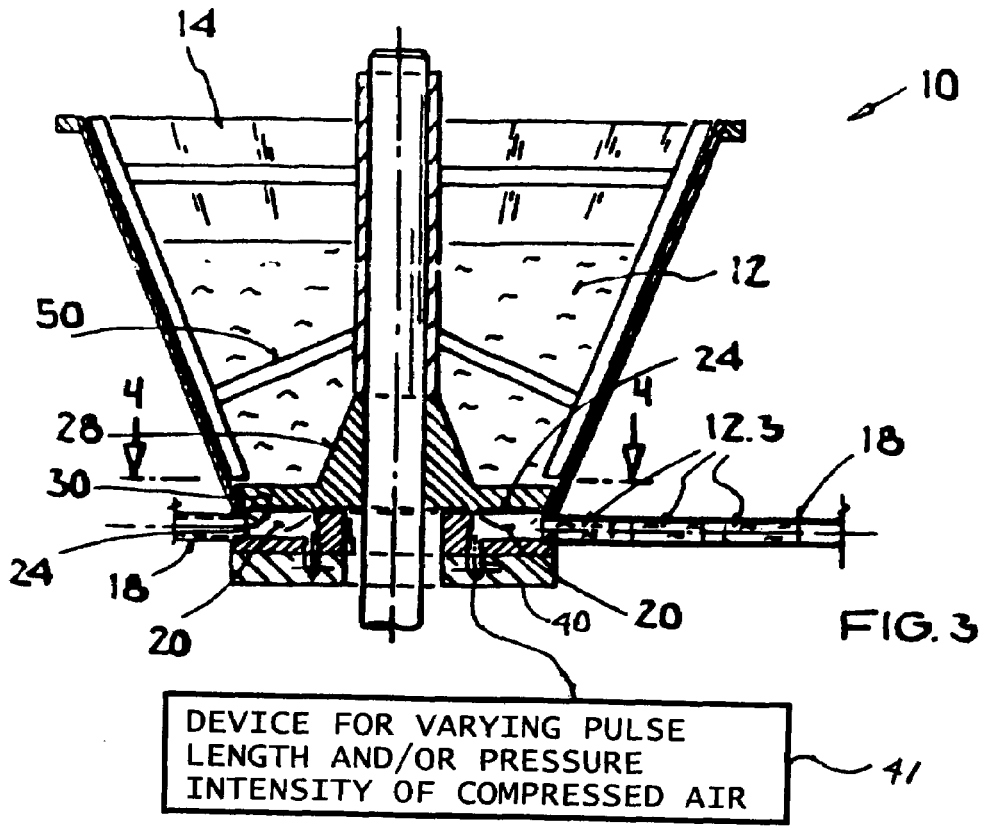
FIG. 3 is a cross-sectional view similar to that of FIG. 1, shown with closed bottom outlets.
Figure 4:
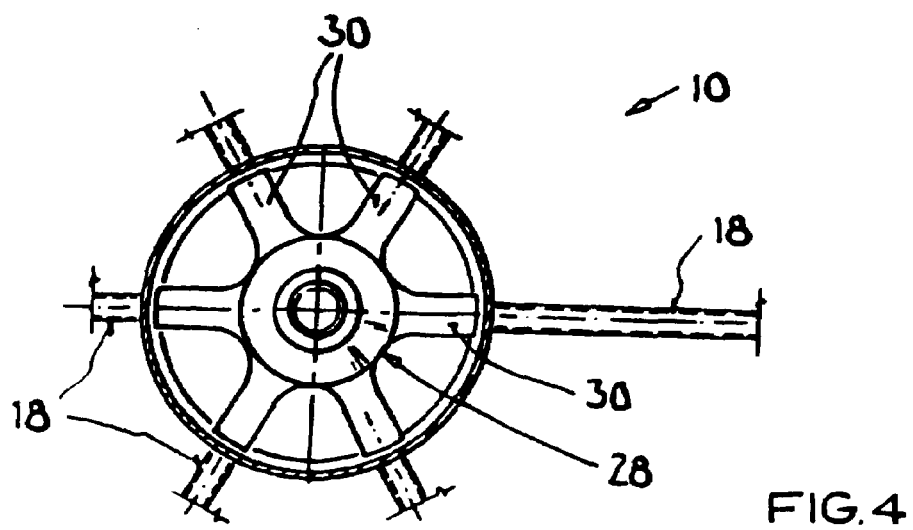
FIG. 4 is a cross-sectional view through the bottom region of the storage vessel of FIG. 3, taken along line 4-4 of FIG. 3.

FIGS. 3 and 4 illustrate the state in which the six scraping arms 30 are all simultaneously aligned above the corresponding six orifices 24. In this position, the chamber-like line regions 20 can be emptied.

Figure 5:
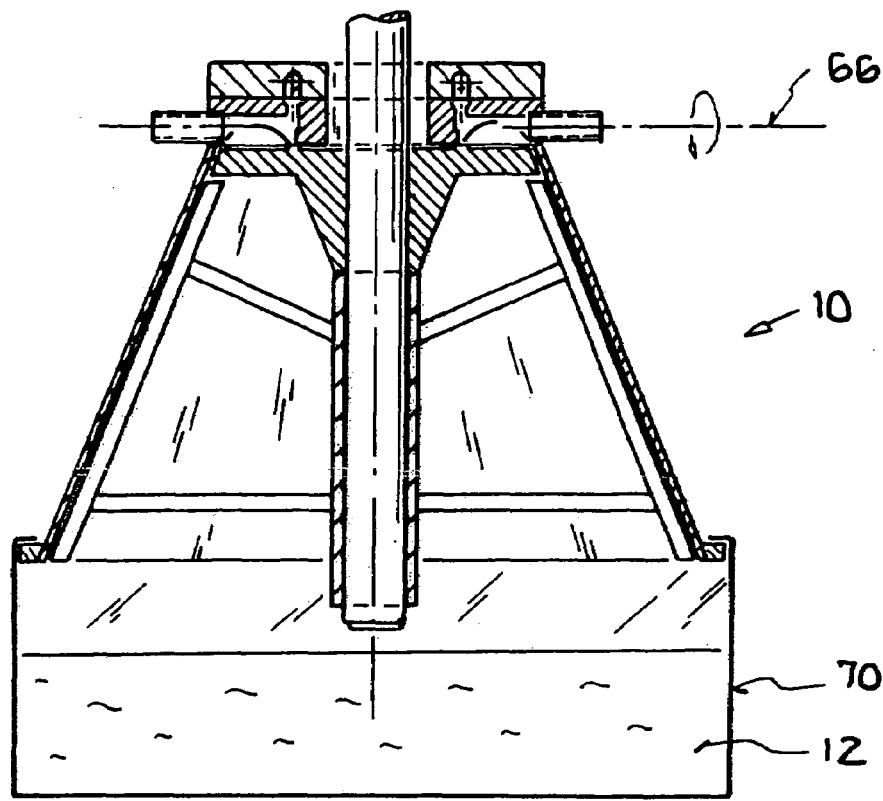
FIG. 5 is a longitudinal cross-section through an exemplary storage vessel according to the present invention, pivoted through 180⁰ and docked at a powder container.
Figure 6:
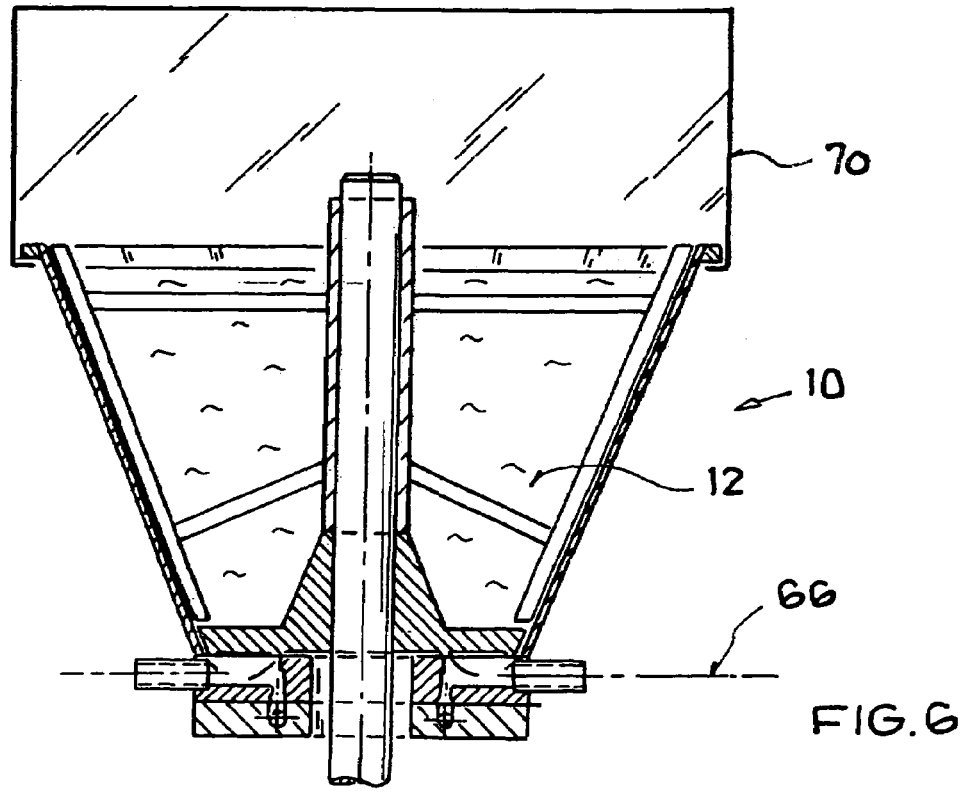
FIG. 6 shows the storage vessel of FIG. 5, which, together with the powder container, is pivoted back upward again through 180°, and which is filled with powder out of the powder container.

Once substantially all of the pulverulent filling material 12 has been transported out of the storage vessel 10 through the lines 18 and the storage vessel 10 is consequently empty, the storage vessel 10 can be pivoted through an angle of 180° about an axis 66, as shown in FIGS. 5 and 6. In the exemplary embodiment shown, the axis 66 is substantially horizontal, however alternative configurations are possible. Once inverted, the cover 14 of the storage vessel 10 can be removed, or has previously been removed. A powder container 70 which contains pulverulent filling material 12 and from which the upper cover has been removed can then be docked from below onto the storage vessel 10 (FIG. 5). Subsequently, the storage vessel 10, together with the docked powder container 70, can be pivoted upward through 180° again. The storage vessel 10 is then again in its position illustrated in FIGS. 1 and 3. The pulverulent filling material 12 present in the powder container 70 can then fall downward out of the powder container 70 into the storage vessel 10. As soon as the powder container 70 is empty, it can be removed from the storage vessel 10 and the storage vessel 10 closed again by means of the cover 14. Alternatively, the powder container 70 could remain on the storage vessel 10, so that the cover 14 could be dispensed with. During the aforementioned refilling of the storage vessel 10 with pulverulent filling material 12, substantially no pulverulent filling material 12 is transported away from the storage vessel 10 through the lines 18. This does not impede the work of the filling device connected to the lines 18, since the metering devices present near the filling devices have in each case their own small stores for the pulverulent filling material 12. The lines 18 connected to the storage vessel 10 end in these stores which belong to the prior art and are not illustrated in the drawings.

The pressure pulses can be controlled in terms of their pulse length and/or their pressure intensity in the chamber-like line regions of the lines 18, through monitoring of the fill level of the filling material still present in the respective stores. Accordingly, only the chamber-like line regions 20 that are connected to lines 18 issuing into stores that need to be filled with pulverulent filling material are emptied by means of one or more pressure pulses.

Referring to FIG. 3, three portions 12.3 of pulverulent filling material 12 are illustrated in line 18 located on the right-hand side of the figure. Each of these portions 12.3 can correspond to the quantity of pulverulent filling material pressed out of a chamber-like region 20 by means of a compressed air pulse issued into the closed chamber-like region 20 through compressed air duct 40. The compressed air pulses are controlled by device 41 that varies at least one pulse length and/or pressure intensity as described above and below. The pulverulent filling material 12 or the portion 12.3 is in each case pressed only a little way into the line 18 and pressed further on. The emptying operation can take place several times in succession, so that portions 12.3 are arranged in succession, like beads on a chain, in the line 18. In each case, the most-recent portion 12.3 to enter the line 18 pushes the front portions 12.3 through the line 18. The individual portions 12.3 leave the line in succession at its other end, not illustrated in the drawing.

Figure 7:
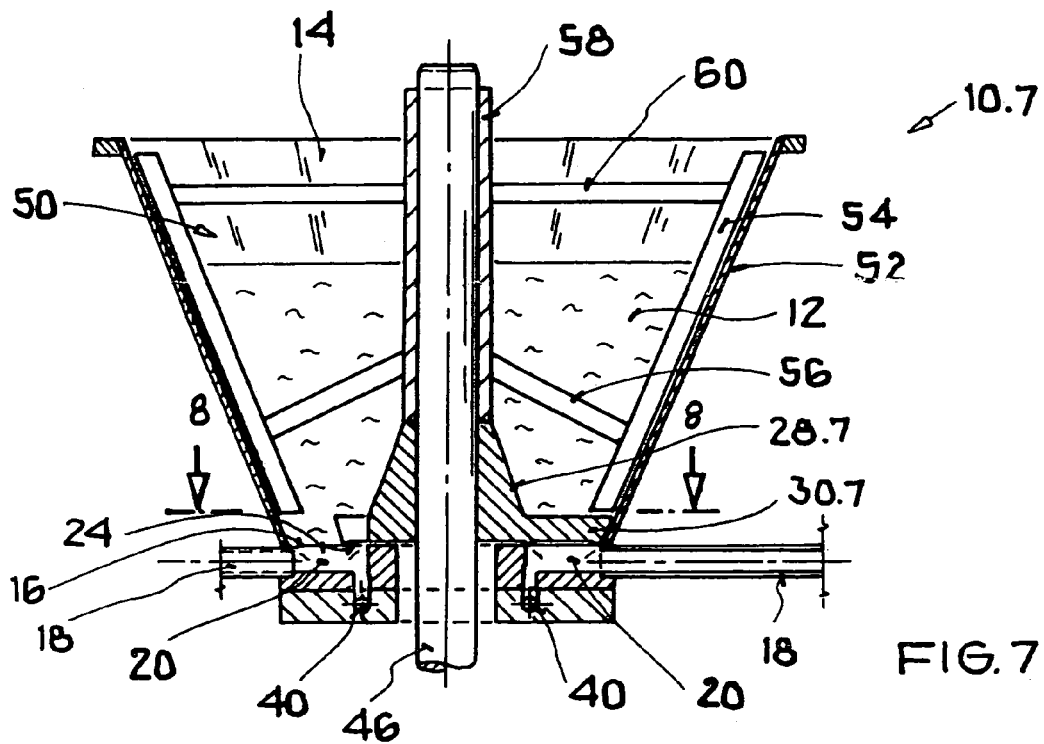
FIG. 7 is a cross-sectional view similar to FIG. 1, of another exemplary storage vessel according to the present invention, taken along line 7-7 of FIG. 8.
Figure 8:
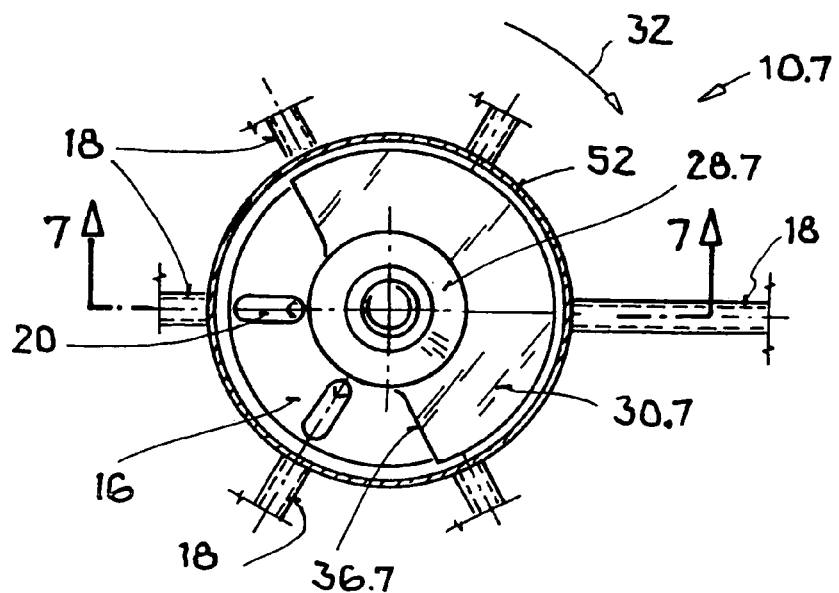
FIG. 8 is a cross-sectional view through the bottom region of the storage vessel of FIG. 7, taken along line 8-8 of FIG. 7.

The storage vessel 10.7 illustrated in FIGS. 7 and 8 differs from the storage vessel 10 in its scraper 28.7. The scraper 28.7 includes a single scraping arm 30.7. This scraping arm 30.7 can have such a large area extending parallel to the bottom 16 that it simultaneously covers a plurality of (e.g., three or four) the orifices 24 in the bottom 16. In contrast, the previously described scraper 28 of the storage vessel 10 (FIGS. 1-6) can simultaneously cover or uncover all of the orifices 24. Thus, in the case of scraper 28.7, the orifices 24 closed in each case can remain closed for a longer period of time compared to scraper 28, for similar speeds of rotation. As a result, compressed air can be conducted through the respective compressed air duct 40 into the chamber-like line region 20 for comparatively longer than is possible in the case of the scraper 28.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An apparatus for transporting pulverulent filling material, comprising:

a storage vessel including at least one exit, the at least one exit comprising an orifice in a bottom region of the storage vessel;

a chamber-like line region constituting a powder chamber located at the at least one exit of the storage vessel;

a line connected to the chamber-like line region, through which a portion of the pulverulent filling material present in the chamber-like line region is transported out of the chamber-like line region, the line having a rear-end region connected to the chamber-like line region;

a compressed air duct that issues at least one compressed air pulse into the chamber-like line region, wherein the compressed air duct issues into the rear-end region of the line; and a closing device for the chamber-like line region, the closing device adapted to close the chamber-like line region powder tight with respect to the storage vessel so that the at least one compressed air pulse presses at least a portion of the pulverulent filling material out of the chamber-like line region in portions; and at least one scraper adapted to move over the at least one exit in the storage vessel to move pulverulent filling material out of the storage vessel and into the chamber-like line region in communication with the at least one exit in the storage vessel, and to close over the at least one exit in the storage vessel after the pulverulent filling material is introduced.

2. The apparatus of claim 1, wherein the at least one scraper comprises at least one scraping arm movable over one or more of the at least one orifices.

3. The apparatus of claim 2, wherein the at least one scraper comprises a number of scraping arms that corresponds to the number of orifices.

4. The apparatus of claim 1, wherein the at least one scraper is rotatable about a central axis of rotation, and the orifices are distributed circumferentially about the central axis in the bottom portion of the storage vessel.

5. The apparatus of claim 4, further comprising an agitator, wherein the at least one scraper and the agitator are rotatable about the central axis.

6. The apparatus of claim 1, further comprising a device for varying at least one of pulse length and/or pressure intensity of a compressed air pulse produced by the compressed air duct.

* * * * *